(12) United States Patent
Ida et al.

(10) Patent No.: US 10,165,147 B2
(45) Date of Patent: Dec. 25, 2018

(54) CLOUD DATA STORING OF PROPERTY AND SETTING DATA OF IMAGE DATA

(71) Applicants: KABUSHIKI KAISHA TOSHIBA, Tokyo (JP); TOSHIBA TEC KABUSHIKI KAISHA, Tokyo (JP)

(72) Inventors: Toshihiro Ida, Mishima Shizuoka (JP); Hiroshi Watanabe, Yokohama Kanagawa (JP); Kazuhiro Ogura, Hiratsuka Kanagawa (JP); Takahiro Hagiwara, Chiba Chiba (JP); Shinji Makishima, Sunto Shizuoka (JP); Akihiro Mizutani, Mishima Shizuoka (JP); Yusuke Hamada, Mishima Shizuoka (JP); Ken Sakuta, Izunokuni Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/252,081

(22) Filed: Aug. 30, 2016

(65) Prior Publication Data
US 2018/0063360 A1   Mar. 1, 2018

(51) Int. Cl.
| H04N 1/21 | (2006.01) |
| G06F 3/12 | (2006.01) |
| H04N 1/00 | (2006.01) |

(52) U.S. Cl.
CPC ......... *H04N 1/2104* (2013.01); *G06F 3/1203* (2013.01); *G06F 3/1238* (2013.01); *H04N 1/00015* (2013.01); *H04N 1/00018* (2013.01); *H04N 1/00244* (2013.01); *H04N 1/00411* (2013.01); *H04N 2201/0094* (2013.01)

(58) Field of Classification Search
CPC ............. H04N 1/2104; H04N 1/00244; H04N 1/00018; H04N 1/00411; H04N 1/00015; H04N 2201/0094; G06F 3/1238; G06F 3/1203
See application file for complete search history.

(56) References Cited

U.S. PATENT DOCUMENTS

| 7,895,508 B2 * | 2/2011 | Lee ................... G06Q 20/108 705/42 |
| 9,648,175 B2 * | 5/2017 | Niimura ............. H04N 1/00954 |
| 9,854,105 B1 * | 12/2017 | Krishnasamy ..... H04N 1/00037 |

(Continued)

FOREIGN PATENT DOCUMENTS

| JP | 2009176286 A | 8/2009 |
| JP | 2012059234 A | 3/2012 |
| JP | 2015028730 A | 2/2015 |

*Primary Examiner* — Ming Y Hon
(74) *Attorney, Agent, or Firm* — Patterson & Sheridan, LLP

(57) ABSTRACT

An image processing apparatus includes a scanner, a communication interface, and a controller. The controller is configured to generate property and setting data of image data that is generated based on image scanning by the scanner, and control the communication interface to transmit the image data and the property and setting data thereof to a server connected to the image processing apparatus through a network, so that the image data and the property and setting data thereof are stored therein in association with each other.

16 Claims, 13 Drawing Sheets

(56) References Cited

U.S. PATENT DOCUMENTS

| | | | |
|---|---|---|---|
| 2006/0209362 A1* | 9/2006 | Suenaga | H04N 1/0035 358/474 |
| 2006/0267970 A1* | 11/2006 | Minakuchi | H04N 1/00411 345/204 |
| 2007/0231038 A1* | 10/2007 | Uchida | G06F 3/1218 400/76 |
| 2008/0151299 A1* | 6/2008 | Takahata | H04N 1/32 358/1.15 |
| 2008/0151330 A1* | 6/2008 | Takahata | H04N 1/00352 358/497 |
| 2008/0239387 A1* | 10/2008 | Otsuka | G06F 3/1204 358/1.15 |
| 2008/0246993 A1* | 10/2008 | Murakami | G06F 3/1207 358/1.15 |
| 2008/0252944 A1* | 10/2008 | Otsuka | H04N 1/00413 358/474 |
| 2009/0116052 A1* | 5/2009 | Matsuzawa | G06F 3/121 358/1.14 |
| 2009/0190177 A1* | 7/2009 | Hayashi | H04N 1/21 358/1.16 |
| 2009/0303518 A1* | 12/2009 | Sekiya | G06F 21/608 358/1.15 |
| 2010/0238478 A1* | 9/2010 | Yamada | H04N 1/0048 358/1.13 |
| 2010/0259783 A1* | 10/2010 | Matsuzawa | H04N 1/00244 358/1.15 |
| 2014/0043642 A1* | 2/2014 | Yasuoka | H04N 1/00854 358/1.14 |
| 2014/0333960 A1* | 11/2014 | Fukasawa | G06K 15/1817 358/1.15 |
| 2015/0106665 A1* | 4/2015 | Choh | H04L 51/08 714/57 |
| 2016/0086063 A1* | 3/2016 | Horii | G06K 15/005 358/1.15 |
| 2016/0255243 A1* | 9/2016 | Omori | H04N 1/4413 358/1.14 |
| 2016/0277607 A1* | 9/2016 | Tanaka | G06F 17/30011 |

* cited by examiner

FIG. 7

| User | MFP Authentication | | Cloud Authentication | | |
|---|---|---|---|---|---|
| | ID | Password | ID | Password | Access Token |
| A | aaaaaa | ******* | a12345 | ***** | xxxxxxxxxxxxxxxx |
| B | bbbbbb | ******** | b13579 | ****** | yyyyyyyyyyyyy |
| C | cccccc | ****** | c24680 | **** | zzzzzzzzzzzzzz |
| ... | ... | ... | ... | ... | ... |

600

US 10,165,147 B2

CLOUD DATA STORING OF PROPERTY AND SETTING DATA OF IMAGE DATA

FIELD

Embodiments described herein relate generally to an image processing apparatus and a system including the same.

BACKGROUND

In the related art, an image forming apparatus of one type acquires image data stored in a storage device (which is connected over a network) through the network and performs printing of the image data. Additional information, such as the number of pages in accordance with a file format of the image data, may be attached to a file of the image data (image file). Software compatible with the file format of the image file is executed to convert the image file into print data in order to refer to the additional information attached to the image file. That is, the image forming apparatus that has software compatible with the file format of the image file can refer to the additional information of the acquired image file. In other words, the image forming apparatus may have to acquire the image data stored in the storage device in order to refer to the additional information. In addition, when a setting to restrict the number of printable pages is set in the image forming apparatus, the image forming apparatus cannot determine whether or not printing of the image data in accordance with the additional information is restricted until the image file is retrieved from the storage device and converted to the print data.

DESCRIPTION OF THE DRAWINGS

FIG. 7 illustrates correlation of authentication information according to the embodiment.

DETAILED DESCRIPTION

Figure 1:
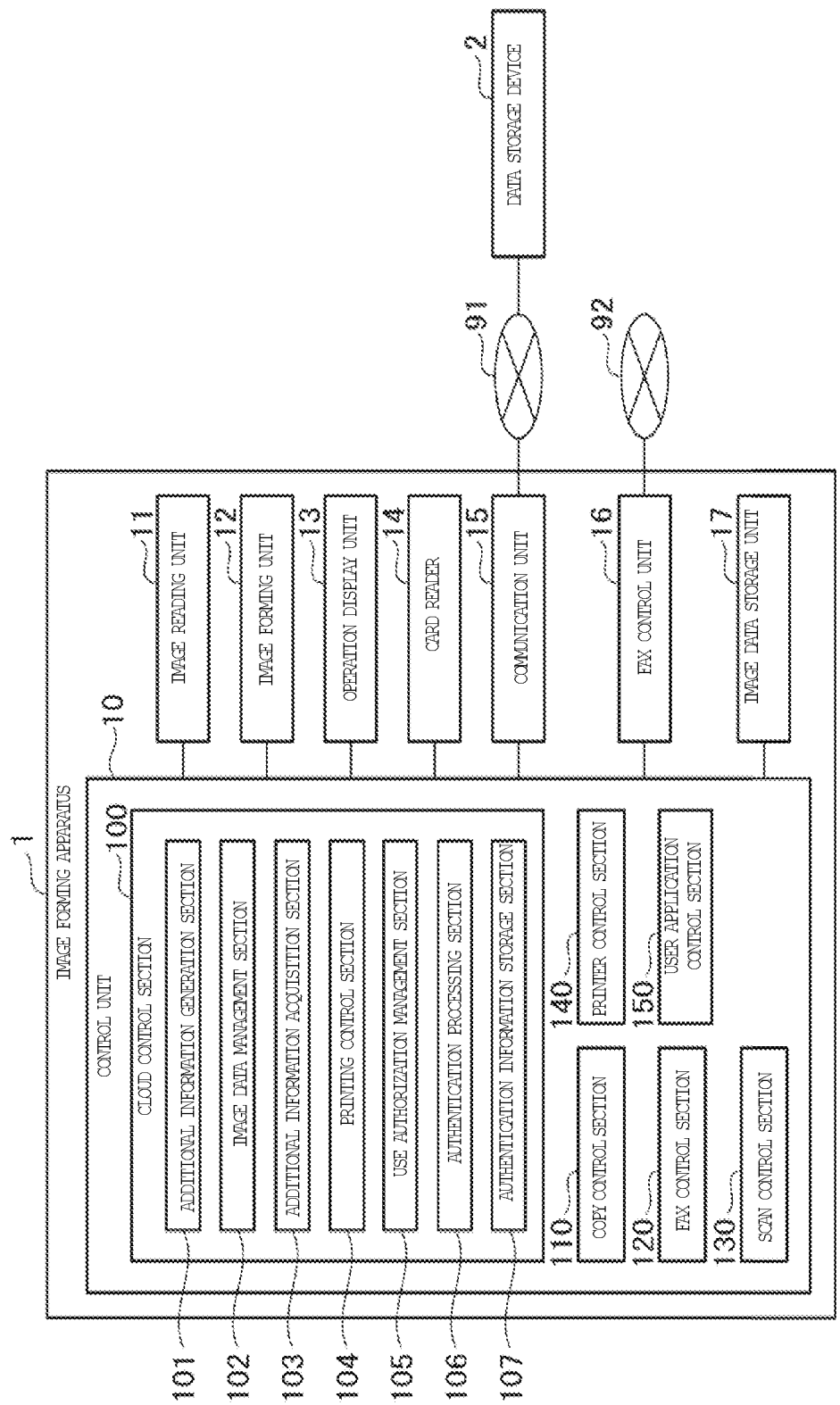
FIG. 1 illustrates a configuration example of an image forming apparatus according to an embodiment.

According to an embodiment, an image processing apparatus includes a scanner, a communication interface, and a controller. The controller is configured to generate property and setting data of image data that is generated based on image scanning by the scanner, and control the communication interface to transmit the image data and the property and setting data thereof to a server connected to the image processing apparatus through a network, so that the image data and the property and setting data thereof are stored therein in association with each other.

Hereinafter, an image forming apparatus, an image forming method, and an image forming system according to an embodiment will be described with reference to the drawings. In the drawings, the same elements are denoted by the same reference signs.

FIG. 1 illustrates a configuration example of an image forming apparatus 1 according to the embodiment. In FIG. 1, the image forming apparatus 1 includes a control unit 10, an image reading unit 11, an image forming unit 12, an operation display unit 13, a card reader 14, a communication unit 15, a FAX control unit 16, and an image data storage unit 17. The image forming apparatus 1 according to the present embodiment forms an image. Formation of an image means operations such as the generation of image data and printing of the image data. The image forming apparatus 1 is, for example, a printer, a scanner, a FAX, a multifunction peripheral (MFP), or the like. In the present embodiment, the image forming apparatus 1 is an MFP.

The image forming apparatus 1 is connected to a data storage device 2 through a network 91, so as to enable communication with the data storage device 2. The image forming apparatus 1 is connected to a FAX device (not illustrated) through a public network 92.

The control unit 10 includes functional sections of a cloud control section 100, a copy control section 110, a FAX control section 120, a scan control section 130, a printer control section 140, and a user application control section 150 (may be abbreviated to "cloud control section 100 and the like"). Each of the cloud control section 100 and the like controls an operation of the corresponding application program (below abbreviated to "application"). For example, the cloud control section 100 serves to control an operation of a cloud application. The operation of a cloud application includes an operation of registering image data in the data storage device 2 or an operation of acquiring image data which is registered in the data storage device 2 and printing the acquired image data. The copy control section 110 operates to control an operation of a copy application, which is executed to perform copying. The FAX control section 120 operates to control an operation of a FAX application, which is executed to perform transmission and reception of data on FAX. The scan control section 130 operates to controls an operation of a scan application, which is executed to perform scanning. The printer control section 140 operates to control an operation of a printer application, which is executed to perform printing. The user application control section 150 operates to control an operation of a user application, which is registered by a user.

The control unit 10 can be achieved by a device which has hardware resources (not illustrated) such as a central processing unit (CPU), a read only memory (ROM), a random access memory (RAM), and an HDD. The control unit 10 executes a program (software) stored in the RAM or the like, and thus can perform the functions of the cloud control section 100 and the like.

Each of the cloud control section 100 and the like operates to control an operation of the corresponding application by using the image reading unit 11, the image forming unit 12, the operation display unit 13, the card reader 14, the communication unit 15, or the FAX control unit 16. For example, the copy control section 110 controls the copy operation by using the image reading unit 11, the image forming unit 12, the operation display unit 13, and the card reader 14. The cloud control section 100 controls the operation of the cloud application by using the image reading unit 11, the image forming unit 12, the operation display unit 13, the card reader 14, and the communication unit 15.

The image reading unit 11 reads an image of an original document and generates image data. The image reading unit 11 is a scanner, for example. The image reading unit 11 reads an image of one side or images of both sides of an original document, and generates image data. The original document is placed on a flatbed or automatically fed from an auto document feeder (ADF). The image reading unit 11 reads an image based on preset scanning conditions. Each application that uses the image reading unit 11 can set the scanning conditions in the image reading unit 11. The image reading unit 11 reads an image under the scanning conditions which are set from each application, and generates image data. The scanning conditions are referred to operation conditions associated with a scan operation. The scanning conditions are conditions for determining, for example, whether an original document is scanned by color or by black and white. The scanning conditions may be conditions of image resolution, double-sided scanning or single-sided scanning, a file format of image data to be generated, setting of an OCR, or the like. The image reading unit 11 stores image data generated under the set scanning conditions, in the image data storage unit 17 in accordance with an operation instruction from the corresponding application.

The image forming unit 12 prints an image corresponding to image data. The image forming unit 12 is, for example, a black-and-white printing device which performs black-and-white printing. The image forming unit 12 may be a color printing device which can perform color printing and black-and-white printing. When the image forming unit 12 is a black-and-white printing device, the image forming unit 12 can print image data of a color image in black and white. For example, the image forming unit 12 reads image data stored in the image data storage unit 17 and prints an image corresponding to the image data, in accordance with an operation instruction from the corresponding application.

The operation display unit 13 includes a display device and an operation device. The display device displays a screen for a user of the image forming apparatus 1. The operation device allows the user to input an operation. The operation display unit 13 is, for example, an operation panel of the image forming apparatus 1. The operation display unit 13 can include a touch panel, a liquid crystal display device, hard keys, or the like.

The card reader 14 reads authentication information from an authentication card provided by a user. The authentication information is information for authorizing the user to use the image forming apparatus 1. After the user causes the card reader 14 to read the authentication card and successful authentication of the user, the user can log in to the image forming apparatus 1, and use the image forming apparatus 1. The user may input an identification (ID) and a password of the user using the operation display unit 13 for log-in, instead of the authentication using the authentication card. The user who successfully logged in can use functions of the image forming apparatus 1 that are allowed to be used by the user (i.e., functions within the use authority of the user). The use authority of the user will be described below. The card reader 14 is, for example, a contact type or non-contact type IC card reader. The card reader 14 outputs the read authentication information to the control unit 10.

The communication unit 15 communicates with the data storage device 2 through the network 91. The network 91 may include a communication line for wired communication, wireless communication, near-field communication, and the like. In the present embodiment, the data storage device 2 is a cloud system that provides a data storage service to a device which is connected through the network. The cloud control section 100 registers image data in the data storage device 2 through the communication unit 15 or acquires image data registered in the data storage device 2, through the communication unit 15.

The FAX communication unit 16 controls transmission and reception of data on FAX, with a FAX device (not illustrated) through the public network 92.

The image data storage unit 17 stores image data. The image data storage unit 17 is, for example, a hard disk drive (HDD), a solid state drive (SSD), and the like. The image data storage unit 17 has a data storage region dedicated for image data, and thus can read the image data at a high speed.

The data storage device 2 provides a cloud service of storing electronic data to a device which is connected to the data storage device 2 through the network. When a user uses the cloud service, the data storage device 2 authorizes the user with an ID and a password (first authentication information). The data storage device 2 issues an access token for using the cloud service on behalf of the user. The data storage device 2 uses an authentication protocol when the data storage device 2 issues the access token. The user accesses the data storage device 2 from the image forming apparatus 1 by using the authentication protocol, and transmits the ID and the password. The data storage device 2 issues the access token based on the transmitted ID and the password, and transmits the issued access token to the image forming apparatus 1. The image forming apparatus 1 can use the cloud service of the data storage device 2 on behalf of the user, by using the transmitted access token. In the present embodiment, the data storage device 2 issues a unique access token for each user of the data storage device 2. The user can set use authority of the data storage device 2 in an access token issued by the data storage device 2. For example, a user may set restriction of an access to user information which is managed by the data storage device 2, in an access token. A user may set an authorized use period of the access token.

The cloud control section 100 includes an additional information generation section 101, an image data management section 102, an additional information acquisition section 103, a printing control section 104, a use authorization management section 105, an authentication processing section 106, and an authentication information storage section 107.

The additional information generation section 101 generates additional information of an image of an original document, which is obtained by reading of the image reading unit 11. The additional information of an image includes, for example, a scan setting in the image reading unit 11, the number of read pages of the original document, scan date and time, the volume (size) of image data generated by the image reading unit 11, text data which is generated by the image reading unit 11 and is obtained by optical character recognition (OCR). That is the additional information may be referred to as property and setting data. The additional information generation section 101 operates to display a setting screen for the scan setting on the operation display unit 13. The additional information generation section 101 sets the scan setting based on user operation of the operation display unit 13 in the image reading unit 11, and generates additional information based on the scan setting.

The image data management section 102 correlates image data generated by the image reading unit 11 and additional information generated by the additional information generation section 101, and registers the image data and the additional information which are correlated with each other, in the data storage device 2. The image data management section 102 uses an access token to register the image data and the additional information in the data storage device 2. The image data management section 102 reads the access token stored in the authentication information storage section 107 (which will be described below) and transmits the read access token to the data storage device 2, to register the image data and the additional information.

The additional information acquisition section 103 acquires additional information registered in the data storage device 2, from the data storage device 2. The additional information acquisition section 103 requires the data storage device 2 to acquire additional information of image data selected from a screen of a cloud application, which is displayed in the operation display unit 13. The additional information acquisition section 103 transmits an access token stored in the authentication information storage section 107 to the data storage device 2, when acquisition of the additional information is required. The additional information acquisition section 103 outputs the acquired additional information to the printing control section 104.

The printing control section 104 controls printing of image data registered in the data storage device 2, by using the additional information which is acquired by the additional information acquisition section 103. For example, the printing control section 104 determines whether or not a setting designated by the acquired additional information is in a scope of a printing authority, and restricts printing of the registered image data. The printing authority is one of a use authority of a user of the image forming apparatus, which is managed by the use authorization management section 105 (which will be described below).

The use authorization management section 105 manages a use authority of a user of an image forming apparatus. The use authority is, for example, an upper limit value of the number of sheets on which printing is performed. The upper limit value is defined for each user. Regarding the upper limit value, a maximum number of sheets on which color printing is performed, and a maximum number of sheets on which black-and-white printing is performed may be respectively designated. The user is authorized to perform printing in a range of the number of sheets on which printing is performed. The upper limit value may be set, for example, for each week, for each month, or for each period of a half year or the like. The use restriction may include use restrictions for each application such as a copy application, a FAX application, or a cloud application. The use authorization management section 105 may operate to display a setting screen for setting the use restriction, on the operation display unit 13 and the like. A case of managing the number of sheets on which color printing is performed, and the number of sheets on which black-and-white printing is performed, as a use condition, will be described below with reference to FIG. 12.

The authentication processing unit 106 transmits the authentication information (referred to as "the first authentication information") such as an ID and a password, required to use the data storage device 2, to the data storage device 2. The authentication processing unit 106 acquires an access token issued by the data storage device 2 in response to the first authentication information transmitted to the data storage device 2. The access token is an example of the use information for using the data storage device 2. The authentication processing section 106 operates to display a setting screen for inputting the first authentication information, on the operation display unit 13. The authentication processing section 106 transmits the input first authentication information to the data storage device 2 by using an authentication protocol, and acquires an access token. The authentication processing section 106 stores the acquired access token in the authentication information storage section 107.

The authentication processing section 106 may operate to display a setting screen for setting an authority of an access token, on the operation display unit 13. The authority of the access token corresponds to, for example, storing (data upload) of image data and additional information in the data storage device 2, and acquisition (data download) of the image data and the additional information from the data storage device 2. The user can perform a setting so that an access to personal information of the user, which is stored in the data storage device 2, be not included in the authority of the access token.

The authentication processing section 106 correlates authentication information (referred to "second authentication information) and the access token with each other, and stores the second authentication information and the access token which are correlated with each other, in the authentication information storage section 107. The second authentication information is used for authorizing a user who uses the image forming apparatus 1. In the present embodiment, the authentication processing section 106 stores the first authentication information and the second authentication information in a one-to-one correlation. However, correlation between the first authentication information and the second authentication information is not limited to one-to-one correlation. For example, the authentication processing section 106 may correlate plural pieces of second authentication information and one piece of first authentication information with each other, and store the plural pieces of second authentication information and the one piece of first authentication information which are correlated with each other. For example, when the image forming apparatus 1 uses one piece of the first authentication information, users of the image forming apparatus 1 may share image data stored in the data storage device 2.

The authentication information storage section 107 stores the first authentication information, the second authentication information, and the access token in correlation with each other. Details of the first authentication information, the second authentication information, and the access token stored in the authentication information storage section 107 will be described below with reference to FIG. 7.

In FIG. 1, the authentication processing section 106 and the authentication information storage section 107 are illustrated as the functions of the cloud control section 100.

However, for example, an application for providing an authentication service may be separately provided, to manage authentication information used in the image forming apparatus 1.

FIG. 1 illustrates a case where the functions of the cloud control section 100 and the like provided in the control unit 10 are achieved by software which is executed by the CPU. However, the one or more functions of the cloud control section 100 and the like which are provided in the control unit 10 may be achieved by hardware. Regarding each of the functions provided in the control unit 10, one function may be divided into a plurality of sub-functions, and each of the sub-functions may be performed. Regarding each of the functions performed by the control unit 10, two or more functions may be integrated to be one function.

Figure 2:
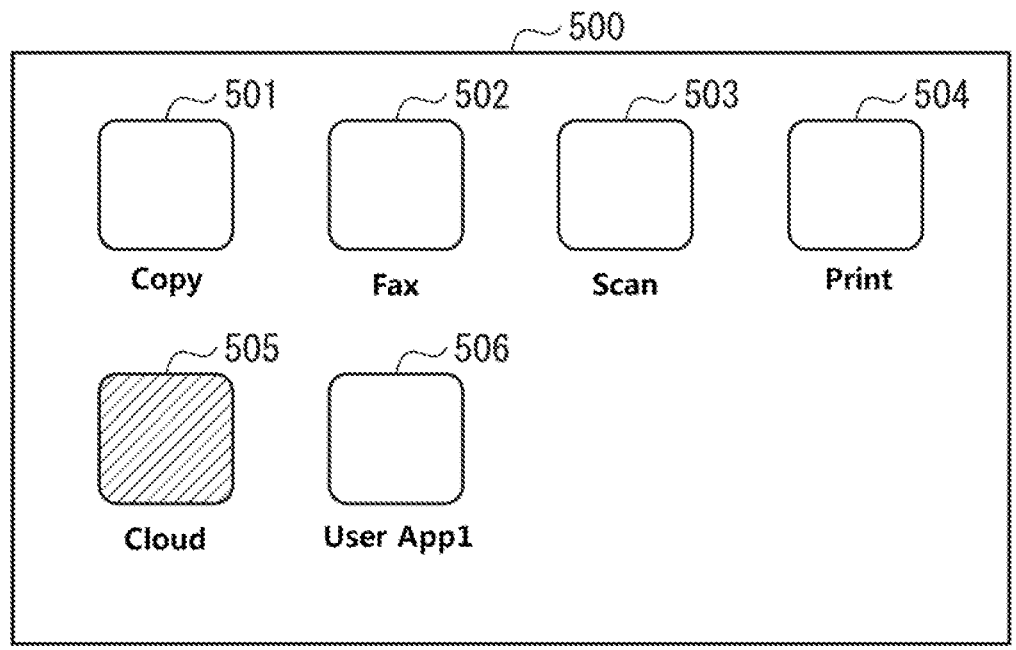
FIG. 2 illustrates an application selection screen displayed on an operation display unit of the image forming apparatus.

FIG. 2 illustrates an example of an application selection screen 500 of the operation display unit 13 according to the present embodiment. In FIG. 2, the application selection screen 500 includes application selection buttons, which may be a touch screen location, including buttons for a copy application 501, a FAX application 502, a scan application 503, a print application 504, a cloud application 505, and a user application 506. A user may press any application selection button 501-506, to use the corresponding application. FIG. 2 illustrates a state when the button corresponding to the cloud application 505 is selected. When the cloud application 505 is selected, the screen illustrated in FIG. 3 is displayed.

Figure 3:
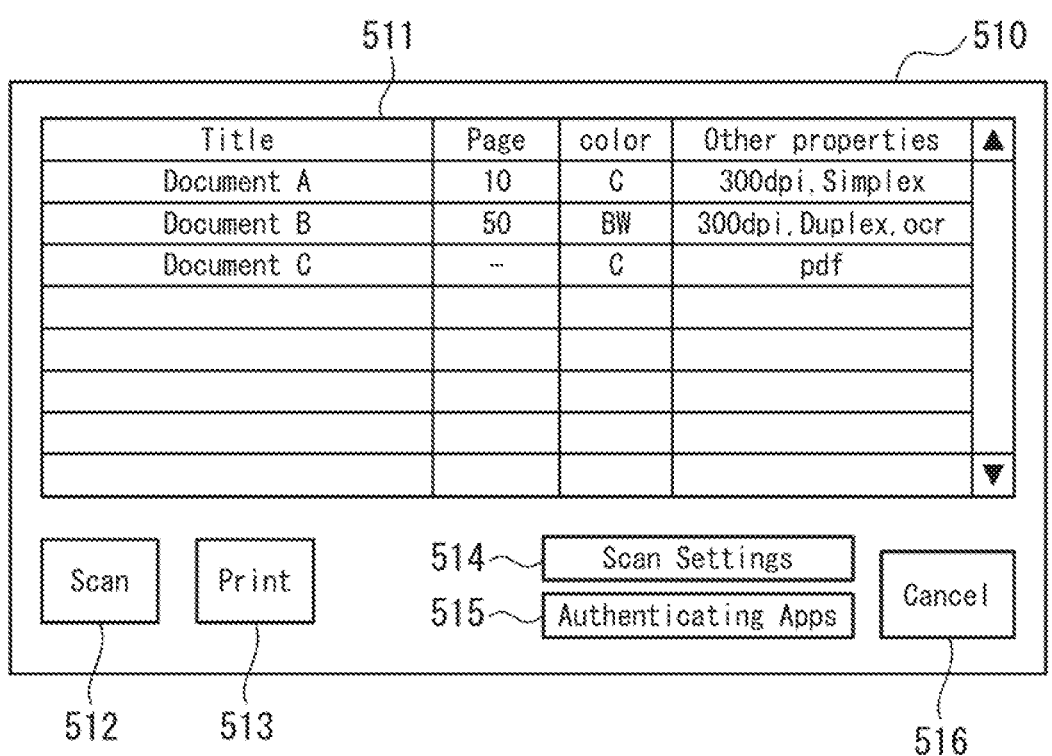
FIG. 3 illustrates a cloud application screen displayed on the operation display unit.

FIG. 3 illustrates an example of a cloud application screen 510 displayed on the operation display unit 13 according to the present embodiment. In FIG. 3, the cloud application screen 510 includes stored-document list display 511, a scan button 512, a print button 513, a scan setting button 514, an application authentication button 515, and a cancellation button 516.

In the stored-document list display 511, a list of original documents (documents) which are stored as image data in the data storage device 2 is displayed. In the stored-document list display 511, additional information of a title, the number of pages, distinction between color and black-and-white, and other properties which are added to the image data are displayed.

The title is a character string which is used for identifying image data and set by a user when an original document is scanned. An input method of the title and the like will be described below in FIG. 4.

The number of pages is the number of sheets of an original document when the original document is read. The number of pages is, for example, the number of sheets read by an ADF when the original document is read by the ADF. The number of pages when an original document is read on a flatbed is the number of sheets determined based on explicit user operations of a start and an end of reading.

The number of pages is not displayed in "Document C" illustrated in FIG. 3. "Document C" is, for example, image data registered in the data storage device 2 from a PC. When additional information is not added to the image data received from the PC, the data storage device 2 cannot display a page count for Document C. Thus, the number of pages is not displayed as the additional information in the stored-document list display 511. Because the file of the Document C has predetermined data volume, data volume maybe displayed in the stored-document list display 511. However, because the data volume varies depending on resolution, and property of color or black-and-white, the number of pages when printing is performed cannot be displayed in the stored-document list display 511 only using the data volume (size).

The property of color or black-and-white is designated by a user when reading is started. Regarding the property of color or black-and-white, the property may selected as color when only part of the pages includes a color page. For example, when the data storage device 2 provides a thumbnail display, determination whether or not a color page is included is performed only when all pages are displayed. According to the present embodiment, the property of color or black-and-white is displayed as the additional information, and thus it is possible for the user to recognize image data including a color page.

In addition, properties of image data other than the number of pages and the property of color or black-and-white are displayed. The other properties include, for example, reading resolution, property of double sides or a single side, whether or not OCR processing is provided, a file format, and the like.

The scan button 512 is a button for starting a reading operation (scanning). The print button 513 is a button for starting a printing operation (printing). The scan setting button 514 is a button for performing scan setting, which will be described with reference to FIG. 4. The application authentication button 515 is a button for performing application authentication processing, which will be described with reference to FIG. 6. The cancellation button 516 is a button for ending the cloud application and returning to the application selection screen 500 illustrated in FIG. 2.

Figure 4:
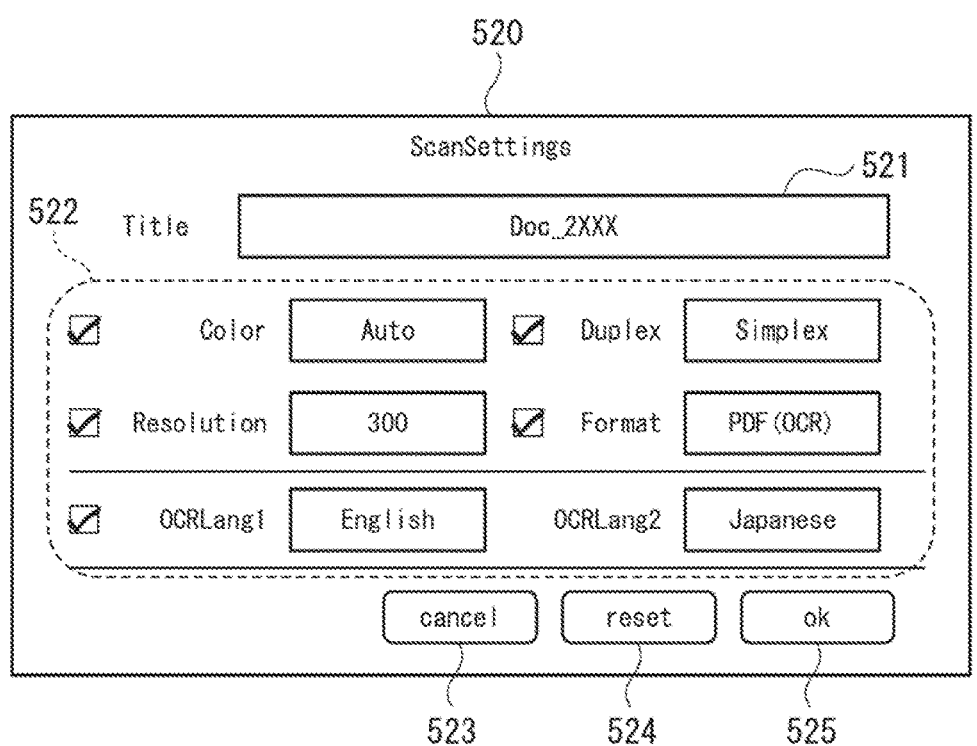
FIG. 4 illustrates an additional information setting screen displayed on the operation display unit.

FIG. 4 illustrates an example of an additional information setting screen 520 displayed on the operation display unit 13 according to the present embodiment. In FIG. 4, the additional information setting screen 520 is displayed when the scan setting button 514 in FIG. 3 is selected. The additional information setting screen 520 is a setting screen for setting information added to image data. The additional information generation section 101 in FIG. 1 generates an item set on the additional information setting screen 520 displayed on the operation display unit 13, as the additional information added to image data.

In FIG. 4, the additional information setting screen 520 includes a title 521, an additional information selection portion 522, a cancellation button 523, a reset button 524, and an OK button 525.

The title 521 is a text box for inputting a text as the additional information added to image data generated by scanning. The text is used for identifying the image data. Any text can be input in the title 521. A serial number and the like may be input in the title 521 in advance as a default title. A text added in the title 521 is displayed in the title of a corresponding entry in the stored document list display 511 in FIG. 3.

The additional information selection portion 522 is a region for selecting additional information to be added to image data. In the additional information selection portion 522, a check box is displayed for each of color, resolution, double sides, and format, and checked properties are thus set as the additional information.

When a check box of color is checked, the additional information generation section 101 generates additional information of color or black-and-white. The additional information selection portion 522 operates to enable selection of setting of color, black-and-white, or auto in a pull-down menu of color. FIG. 4 illustrates a case where auto is selected. When the auto is selected, the image reading unit 11 determines whether or not the read original document includes a color page, and notifies the additional information generation section 101 of information of color or black-and-white. The additional information generation section 101 includes the information (which is selected or of which a notification is performed) of color or black-and-white in the additional information.

When the check box of resolution is checked, the image reading unit 11 reads an original document at designated resolution. The additional information generation section 101 includes the designated resolution in the additional information.

When the check box of duplex is checked, the image reading unit 11 reads an original document in a designated manner of double sided or a single sided. The additional information selection portion 522 operates to enable selection of setting of double sided or a single sided in a pull-down menu of duplex. FIG. 4 illustrates a case where single side is selected. The additional information generation section 101 includes designated setting of duplex or a single side, in the additional information.

When the check box of format is checked, the image reading unit 11 generates image data of the read original document, that has the designated format. The additional information selection portion 522 operates to enable selection of file formats in a pull-down menu of format. FIG. 4 illustrates a case where Portable Document Format® (PDF) is selected, and OCR processing is performed on the generated image data. The additional information generation section 101 includes the designated file format in the additional information.

OCR language 1 and OCR language 2 correspond to setting of a language having a priority in recognition of OCR when OCR is selected in the pull-down menu of format. The additional information selection portion 522 operates to enable selection of languages in pull-down menus of OCR language 1 and OCR language 2. FIG. 4 illustrates a case where English is selected as OCR language 1, and Japanese is OCR language 2. The additional information generation section 101 includes the selected language(s) in the additional information.

The cancellation button 523 is a button for ending setting of additional information. The reset button 524 is a button for causing the setting on the additional information setting screen 520 to an initial setting (default setting). The OK button 525 is a button for applying the setting on the additional information setting screen 520, and for ending the setting of the additional information.

Figure 5:
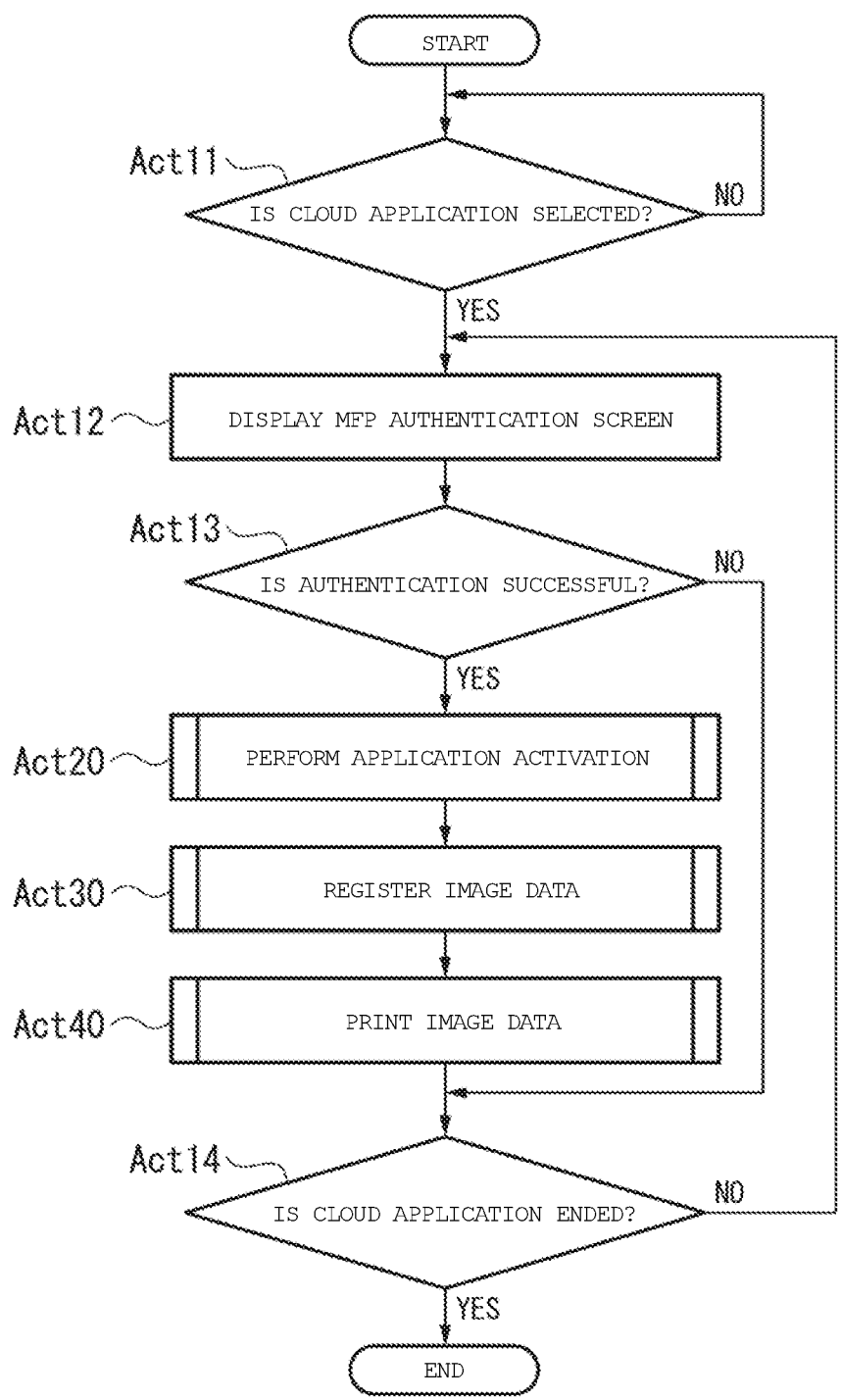
FIG. 5 is a flowchart illustrating an operation of a cloud application according to the embodiment.

FIG. 5 is a flowchart illustrating an operation of the cloud application according to the present embodiment. Here, the cloud control section 100 performs operations described in flowcharts and a sequence diagram illustrated in FIGS. 5, 6, 8, 9, 10, and 11.

In FIG. 5, the cloud control section 100 determines whether or not a cloud application is selected (Act11). The cloud control section 100 can determine whether or not the cloud application is selected, based on whether or not the cloud application 505 illustrated in FIG. 2 is selected. When it is determined that no cloud application is selected (Act11: NO), the cloud control section 100 repeats Act11, and waits for selection of the cloud application.

When it is determined that the cloud application is selected (Act11: YES), the cloud control section 100 displays an authentication screen of MFP on the operation display unit 13 (Act12). The authentication screen of MFP is a screen for inputting the above-described second authentication information. The user inputs the second authentication information using the operation display unit 13, to use the image forming apparatus 1. The user may cause the card reader 14 to read authentication information from an authentication card of the user, so as to input the second authentication information.

After Act12 is performed, the cloud control section 100 determines whether or not authentication is successful (Act13). The cloud control section 100 can determine whether or not authentication is successful, for example, based on whether or not the input authentication information matches authentication information stored in the authentication information storage section 107.

When it is determined that authentication is successful (Act13: YES), the cloud control section 100 performs application activation processing (Act20). Details of the application activation processing in Act20 will be described below with reference to FIG. 6.

After Act20 is performed, the cloud control section 100 performs image data registration processing (Act30). Details of the image data registration processing in Act30 will be described below with reference to FIGS. 8 and 9.

After Act30 is performed, the cloud control section 100 performs image data printing processing (Act40). Details of the image data printing processing in Act40 will be described below with reference to FIG. 11.

After Act40 is performed, or when it is determined that authentication is not successful (Act13: NO), the cloud control section 100 determines whether or not the cloud application is ended (Act14). The cloud control section 100 can determine whether or not the cloud application is ended, based on whether or not the cancellation button 516 in FIG. 3 is selected. When it is determined that the cloud application is not ended (Act14: NO), the cloud control section 100 causes the process to return to Act12, and repeats the processes. When it is determined that the cloud application is ended (Act14: YES), the cloud control section 100 ends the cloud application.

Figure 6:
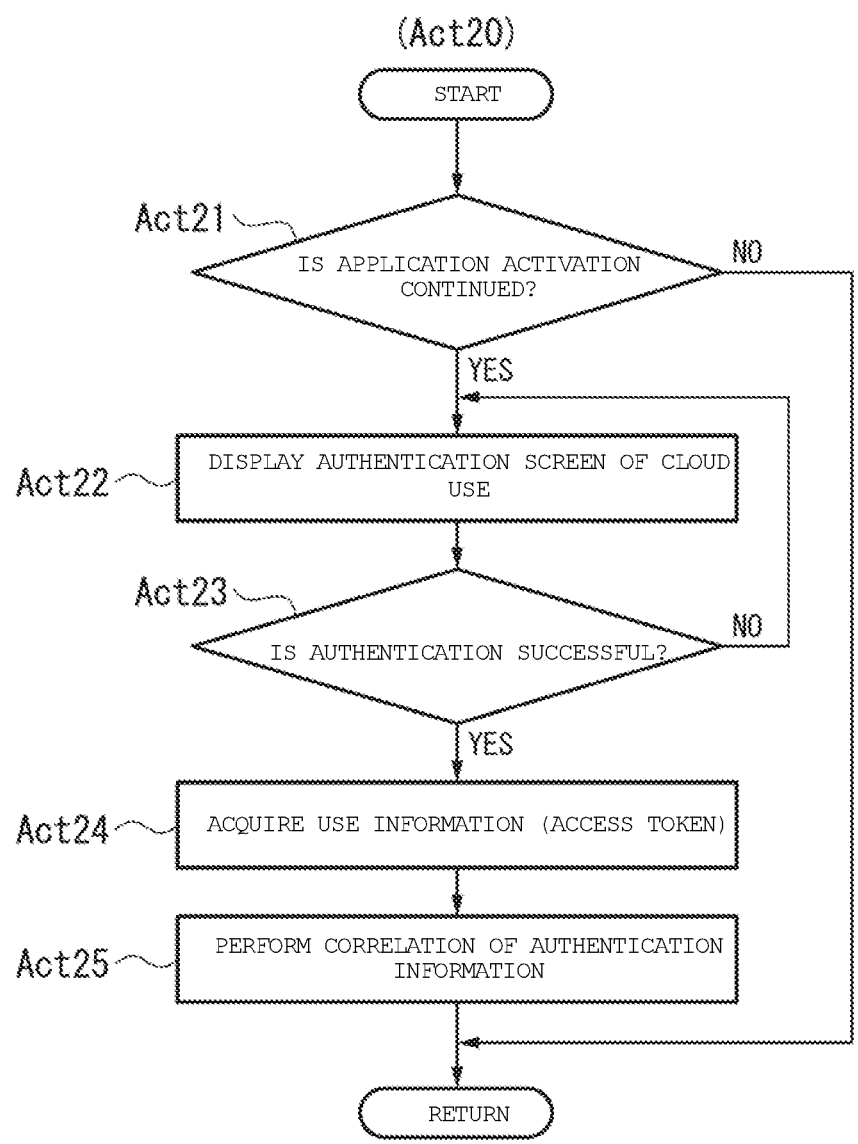
FIG. 6 is a flowchart illustrating an operation of application activation processing of the cloud application according to the embodiment.

FIG. 6 is a flowchart illustrating an operation example of the application activation processing of the cloud application according to the present embodiment, carried out in Act20. In FIG. 6, the cloud control section 100 determines whether or not the application activation processing is continued (Act21). The cloud control section 100 can determine whether or not the application activation processing is continued, based on whether or not the application authentication button 515 in FIG. 3 is selected. When it is determined that the application activation processing is not continued (Act21: NO), the cloud control section 100 ends the application activation processing of Act20.

When it is determined that the application activation processing is continued (Act21: YES), the cloud control section 100 accesses the data storage device 2 by using an authentication protocol, and displays an authentication screen of the data storage device 2 on the operation display unit 13 (Act22). The user inputs the first authentication information on a screen for authentication displayed on the operation display unit 13. The cloud control section 100 transmits the input first authentication information to the data storage device 2 by using the authentication protocol.

After Act22 is performed, the cloud control section 100 determines whether or not authentication by the data storage device 2 is successful (Act23). When it is determined the authentication by the data storage device 2 is not successful (Act23: NO), the cloud control section 100 performs Act22 again, and waits for successful authentication.

When it is determined that authentication by the data storage device 2 is successful (Act23: YES), the cloud control section 100 acquires an access token, which is exemplified as the use information, from the data storage device 2 (Act24).

After Act24 is performed, the cloud control section 100 stores the acquired access token and the second authentication information in the authentication information storage section 107, in correlation with each other (Act25). After Act25 is performed, the cloud control section 100 ends the application activation processing of Act20.

According to the authentication protocol, the first authentication information transmitted to the data storage device 2 is encrypted, and thus the first authentication information cannot be stored in the image forming apparatus 1. FIG. 7 illustrates a correspondence between the first authentication information, the second authentication information, and the access token.

FIG. 7 illustrates correlation of the authentication information in the present embodiment. In FIG. 7, the authentication information 600 indicates correlation among authentication information of an MFP, authentication information of the data storage device 2, and an access token, for each user. The authentication information of the MFP corresponds to the second authentication information. The authentication information of the data storage device 2 corresponds to the first authentication information. The access token is generated based on the first authentication information by the data storage device 2. FIG. 7 illustrates a case where the access token is different for each user. However, for example, the access token may be shared by a plurality of users of the image forming apparatus 1. The access token maybe shared by a plurality of users who are classified as belonging to the same authority group.

The authentication information storage section 107 may set an expiration date in the access token. For example, even when an access token issued by the data storage device 2 does not have a limit of a use period (expiration data), the authentication information storage section 107 discards the access token when a preset period of time elapses. By discarding the access token, it is possible to improve security of the access token.

The authentication processing section 106 acquires an access token by using the first authentication information. However, the first authentication information is not stored in the authentication information storage section 107. The first authentication information is not stored, and thus it is possible to ensure security of the first authentication information. The authentication information storage section 107 may store the first authentication information in accordance with setting of a user. The first authentication information is stored in the authentication information storage section 107, so that the user does not need to repetitively input the first authentication information.

Figure 8:
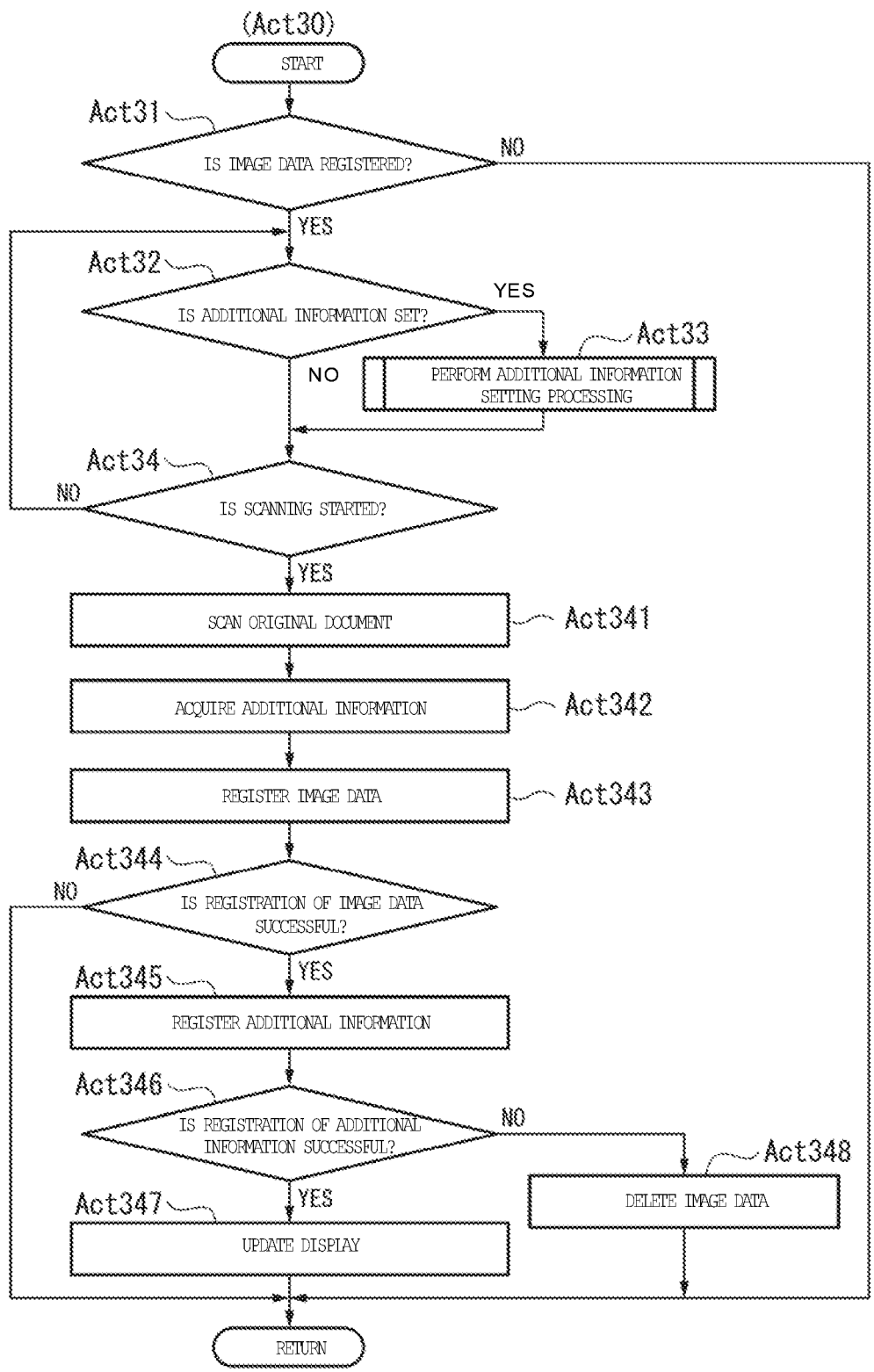
FIG. 8 is a flowchart illustrating an operation of image data registration processing of the cloud application according to the embodiment.

FIG. 8 is a flowchart illustrating an operation of the image data registration processing of the cloud application according to the present embodiment, carried out in Act30. In FIG. 8, the cloud control section 100 determines whether or not the image data registration processing is continued (Act31). The cloud control section 100 can determine whether or not the image data registration processing is continued, based on whether or not the scan button 512 in FIG. 3 is selected. When it is determined that the image data registration processing is not continued (Act31: NO), the cloud control section 100 ends the image data registration processing of Act30.

When it is determined that the image data registration processing is continued (Act31: YES), the cloud control section 100 determines whether or not additional information setting processing is performed (Act32). The cloud control section 100 can determine whether or not the additional information setting processing is performed, based on whether or not the scan setting button 514 in FIG. 3 is selected. When it is determined that the additional information setting processing is performed (Act32: YES), the cloud control section 100 performs the additional information setting processing (Act33). Details of the additional information setting processing in Act33 will be described with reference to FIG. 10.

When it is determined that the additional information setting processing is not performed (Act32: NO), or after the process of Act33 is performed, the cloud control section 100 determines whether or not scanning is started (Act34). The cloud control section 100 can determine whether or not scanning is started, based on whether or not a hard key (not illustrated) of the operation display unit 13 is selected. When it is determined that the additional information setting processing is not performed (Act32: NO), the cloud control section 100 sets that the setting of additional information which is previously set is used as it is. When it is determined that scanning is not started (Act34: NO), the cloud control section 100 causes the process to return to Act32, and waits for start of the scanning.

When it is determined that scanning is started (Act34: YES), the cloud control section 100 starts scanning of an original document (Act341). The image reading unit 11 performs scanning of the original document. The image reading unit 11 reads the original document and generates image data, and stores the generated image data in the image data storage unit 17.

After Act341 is performed, the cloud control section 100 acquires additional information (Act342). The additional information is acquired based on the setting of the additional information setting screen 520 in FIG. 4.

After Act342 is performed, the cloud control section 100 registers image data stored in the image data storage unit 17, in the data storage device 2. When the cloud control section 100 registers the image data, the cloud control section 100 uses an access token. By using the access token, the cloud control section 100 can use the data storage device 2 on behalf of the user.

After Act343 is performed, the cloud control section 100 determines whether or not registration of the image data is successful (Act344). Whether or not registration of the image data is successful can be determined by acquiring data indicating success or failure, from the data storage device 2. When it is determined that registration of the image data is not successful (Act344: NO), the cloud control section 100 ends the process of the image data registration in Act30.

When it is determined that registration of the image data is successful (Act344: YES), the cloud control section 100 registers the additional information of the registered image data in the data storage device 2, in correlation with the image data (Act345). The additional information can be registered, for example, as meta data of the registered image data in the data storage device 2. In the present embodiment, after the image data is registered, the additional information is registered. However, a timing of registering the additional information maybe arbitrarily determined. For example, since data indicating, for example, the number of pages of an original document cannot be set in the additional information until image data is generated, the cloud control section 100 registers the additional information simultaneously with registration of the image data or at a timing after the image data is registered. The cloud control section 100 may register additional information such as user information and a title before the image data is registered.

After Act345 is performed, the cloud control section 100 determines whether or not registration of the additional information is successful (Act346). The cloud control section 100 can acquire data indicating success or failure, from the data storage device 2, and thus can determine whether or not the registration of the additional information is successful.

When it is determined that the registration of the additional information is successful (Act346: YES), the cloud control section 100 updates display of the stored-document list display 511 in FIG. 3, and displays a list of new registered image data (Act347).

When it is determined that the registration of the additional information is not successful (Act346: NO), the cloud control section 100 deletes the registered image data (Act348). The cloud control section 100 deletes the image data registered when it is determined that the registration of the additional information is not successful, and thus can prevent registration of image data which has no additional information.

After Act347 or Act348 is performed, the cloud control section 100 ends the image data registration processing of Act30.

Figure 9:
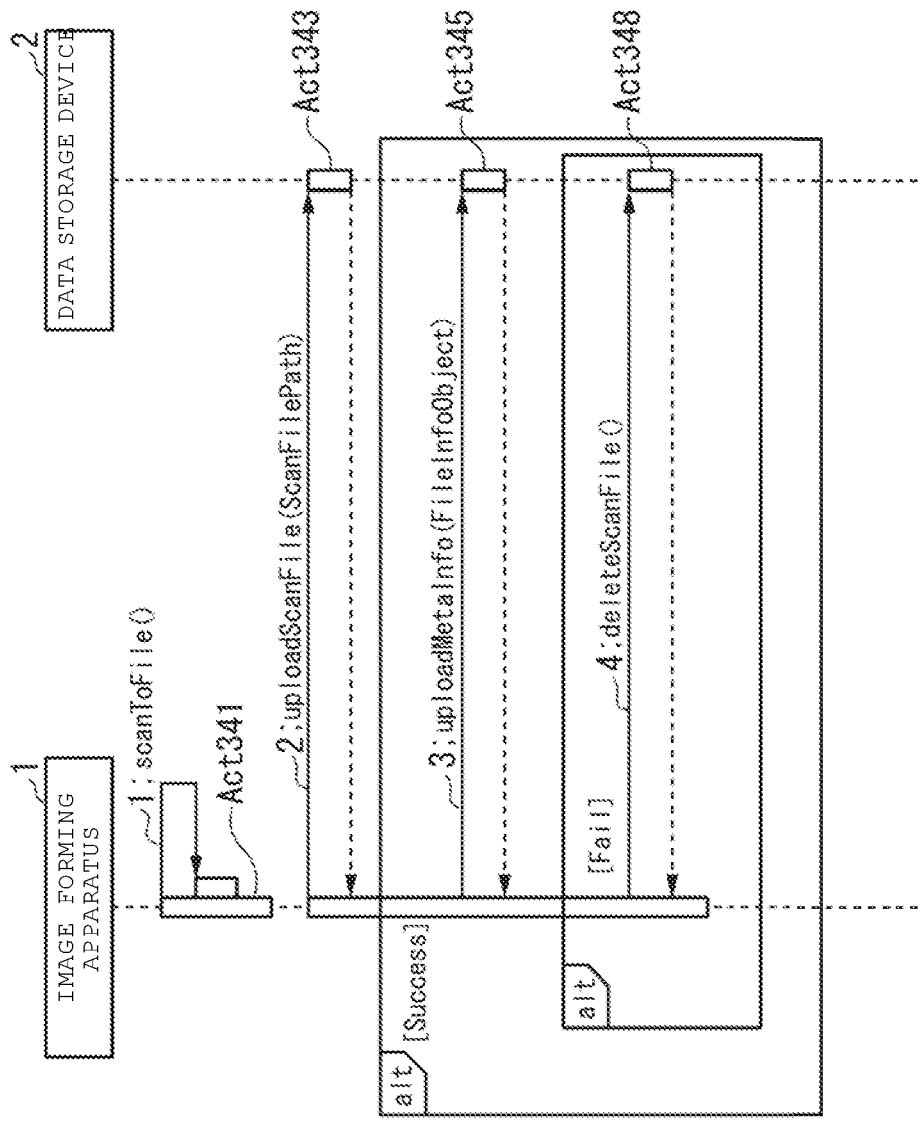
FIG. 9 is a sequence diagram illustrating the operation of the image data registration processing of the cloud application according to the embodiment.

Next, transmission and reception of data between the image forming apparatus 1 and the data storage device 2 carried out in the processing illustrated in FIG. 8 will be described with reference to FIG. 9. FIG. 9 is a sequence diagram illustrating the image data registration processing of the cloud application according to the present embodiment. The number (Actxx) of the process illustrated in FIG. 9 corresponds to the number of the process in FIG. 8.

In FIG. 9, first, the image forming apparatus 1 performs a scanning operation so as to generate image data (Act341).

Then, the image forming apparatus 1 registers (uploads) the generated image data in the data storage device 2 (Act343). In response, the data storage device 2 transmits a response indicating whether or not registration of the image data is successful, to the image forming apparatus 1.

When the registration of the image data is successful, the image forming apparatus 1 registers additional information in the data storage device 2 (Act345). In response, the data storage device 2 transmits a response indicating whether or not registration of the additional information is successful, to the image forming apparatus 1.

When the registration of the additional information fails (not successful), the image forming apparatus 1 causes the data storage device 2 to perform deletion of image data (Act348). In response, the data storage device 2 transmits a response indicating whether or not deletion of the image data is successful, to the image forming apparatus 1. The image forming apparatus 1 may retry to perform the deletion of image data in response to the response indicating that the deletion of the image data is not successful.

Figure 10:
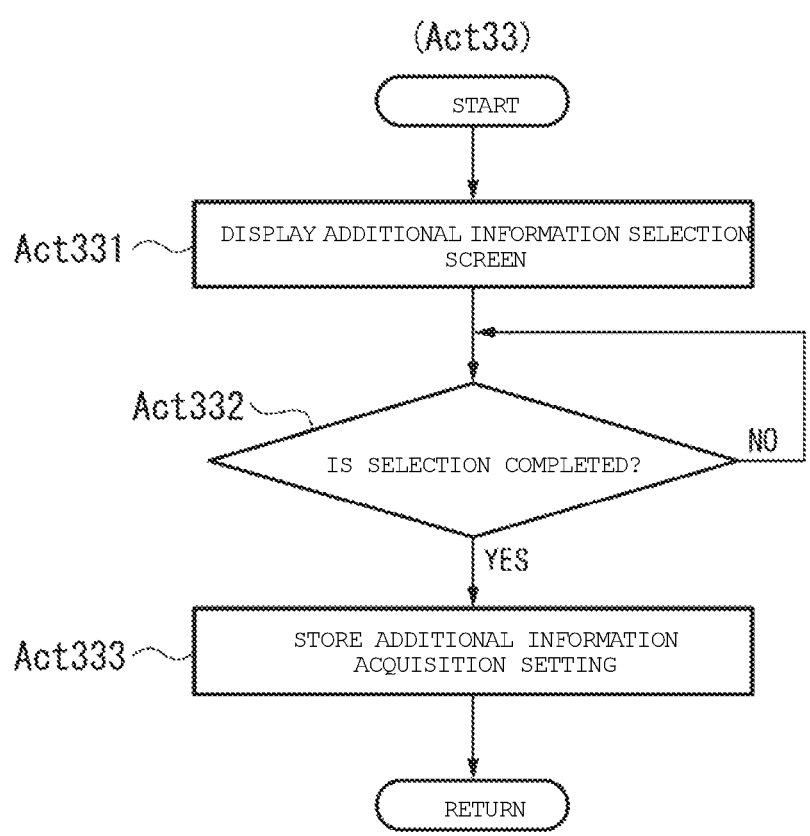
FIG. 10 is a flowchart illustrating an operation of additional information setting processing of the cloud application according to the embodiment.

Next, the additional information setting processing of Act33 in FIG. 8 will be described with reference to FIG. 10. FIG. 10 is a flowchart illustrating an operation of the additional information setting processing of the cloud application according to the present embodiment.

In FIG. 10, the cloud control section 100 displays the additional information setting screen 520 (which is illustrated in FIG. 4) on the operation display unit 13 (Act331). After Act331 is performed, the cloud control section 100 determines whether or not selection is completed (Act332). Determination of whether or not the selection is completed can be performed based on whether or not the OK button 525 (or the cancellation button 523) in FIG. 4 is selected. When it is determined that the selection is not completed (Act332: NO), the cloud control section 100 repeats Act332, and waits for completion of the selection.

When it is determined that the selection is completed (Act332: YES), the cloud control section 100 stores setting for acquisition of the additional information (Act333). When the cancellation button 523 is selected, the setting for the acquisition of the additional information that is previously set is not changed in Act333. After Act333 is performed, the cloud control section 100 ends the additional information setting processing of Act33.

Figure 11:
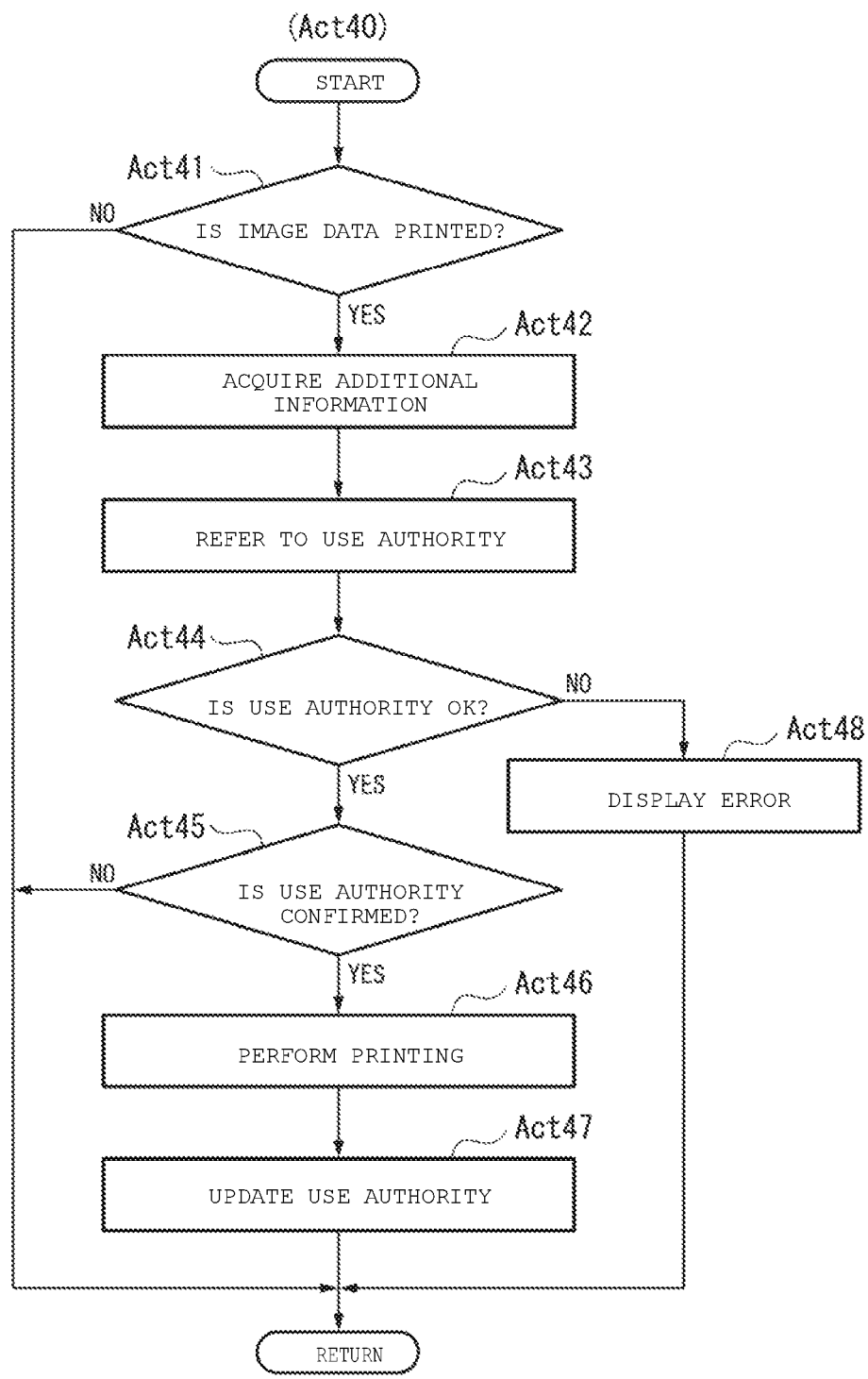
FIG. 11 is a flowchart illustrating an operation of image data printing processing of the cloud application according to the embodiment.

Next, the image data printing processing in Act40 in FIG. 8 will be described in details with reference to FIG. 11. FIG. 11 is a flowchart illustrating an operation of the image data printing processing of the cloud application according to the present embodiment.

In FIG. 11, the cloud control section 100 determines whether or not the image data printing processing is performed (Act41). The cloud control section 100 can determine whether or not the image data printing processing is performed, based on whether or not the print button 513 in FIG. 3 is pressed. When it is determined that the image data printing processing is not performed (Act41: NO), the cloud control section 100 ends the image data printing processing in Act40.

When it is determined that the image data printing processing is performed (Act41: YES), the cloud control section 100 acquires additional information of the image data stored in the data storage device 2 using the access token (Act42). After Act42 is performed, the cloud control section 100 refers to a use authority of a user, which is managed by the use authorization management section 105 (Act43). After Act43 is performed, the cloud control section 100 determines whether or not the acquired additional information is in a scope of the referring use authority (Act44). For example, when the acquired additional information includes the number of pages, the cloud control section 100 determines whether or not the number of pages when image data is printed is in a range of the number of sheets on which printing is performed, and which is restricted by the referring use authority. For example, when the acquired additional information includes additional information of color, the cloud control section 100 determines whether or not color printing is restricted by the use authority. The use authority may include information regarding whether or not the image forming apparatus 1 can perform printing. For example, when the image forming apparatus 1 is a device for printing up to A4 size sheets, it is not possible that the image forming apparatus 1 prints image data having additional information of A3 as it is. When the image forming apparatus 1 is a black-and-white device, it is not possible that the image forming apparatus 1 prints image data having additional information of color. The cloud control section 100 may determine whether or not there are such problems in printing, in Act44.

When it is determined that the acquired additional information is in the scope of the use authority (Act44: YES), the cloud control section 100 determines whether or not the use authority is confirmed by the user (Act45). The cloud control section 100 can determine whether or not the use authority is confirmed, based on whether or not a user performs an operation for confirming the use authority. The cloud control section 100 displays the final confirmation when printing is performed, on the operation display unit 13 so as to prompt the user to perform confirmation. Details of the confirmation of the use authority will be described with reference to FIGS. 13, 15, and 16. When it is determined that the use authority is not confirmed (Act45: NO), the cloud control section 100 ends the image data printing processing of Act40.

When it is determined that the use authority is confirmed (Act45: YES), the cloud control section 100 acquires print data from the data storage device 2, and causes the image forming unit 12 to start printing of the acquired print data (Act46). After Act46 is performed, the cloud control section 100 updates information of the use authority, based on a result obtained by printing in Act45 (Act47).

When it is determined that the acquired additional information is not in the scope of the referring use authority in Act44 (Act44: NO), the cloud control section 100 displays an error on the operation display unit 13 (Act48). Details of error display will be described below with reference to FIG. 14. After Act47 or Act48 is performed, the cloud control section 100 ends the image data printing processing of Act40.

Figures 12, 13:
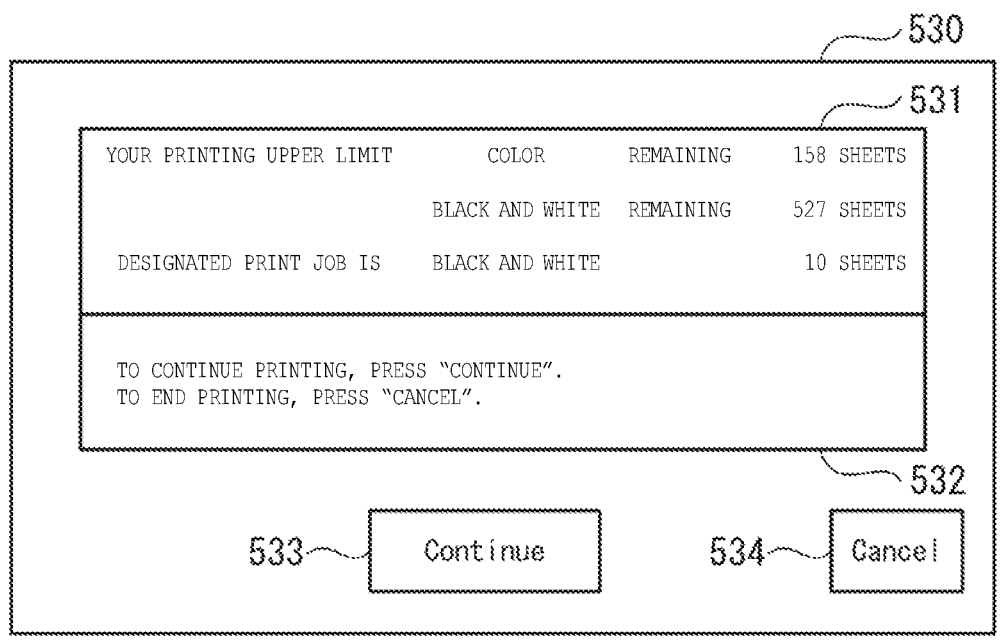
FIG. 12 schematically illustrates a use authority of a user of the image forming apparatus according to the embodiment.
FIG. 13 illustrates a first display example of a user authority display according to the embodiment.

Next, the use authority managed by the use authorization management section 105 will be described with reference to FIG. 12. FIG. 12 illustrates a use authority 610 of users of the image forming apparatus according to the present embodiment.

In FIG. 12, the use authority 610 includes columns of a user name, the number of remaining sheets on which color printing is allowed, and the number of remaining sheets on which black-and-white printing is allowed for each user. For example, the user authority 610 indicates that a user A can do color printing of 158 sheets black-and-white printing of 527 sheets. The cloud control section 100 refers to the number of printable sheets by color and by black and white, with reference to the use authority 610 in Act43 in FIG. 11. The cloud control section 100 determines the use authority by comparison with the additional information, in Act44.

Next, a screen displayed on the operation display unit 13 in Act45 or Act48 in FIG. 11 will be described with reference to FIGS. 13 to 16.

FIG. 13 illustrates a first display example of a user authority display 530 on the operation display unit 13 according to the present embodiment. In FIG. 13, the user authority display 530 includes a user authority information 531, an operation instruction 532, a continuing button 533, and a cancellation button 534.

The user authority information 531 indicates the number of printable sheets for the user and the number of sheets required when print data is printed. While the number of printable sheets by black and white is 527, the number of sheets required for printing is 10. Thus, the user authority information 531 indicates that printing is possible.

An operation instruction for the user is displayed in the operation instruction 532. The operation instruction is used for confirming the use authority. For example, when the number of printable sheets is small, the user can confirm the use authority, so that the user can determine that printing cannot be performed. When the continuing button 533 is selected, the cloud control section 100 starts printing. When the cancellation button 534 is selected, the cloud control section 100 cancels the printing.

Figure 14:
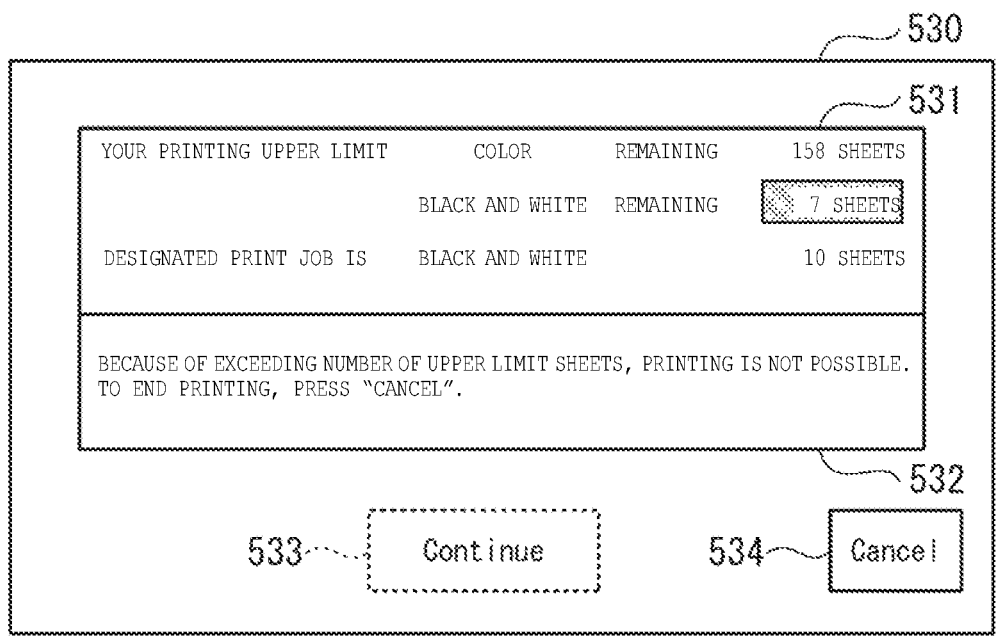
FIG. 14 illustrates a second display example of the user authority display according to the embodiment.

FIG. 14 illustrates a second display example of the user authority display 530 displayed on the operation display unit 13 according to the present embodiment. In FIG. 14, the user authority information 531 indicates that while the number of printable sheets in black and white is 7, the number of sheets required for printing is 10. Thus, an error indicating that printing is not possible is displayed.

The operation instruction 532 indicates an instruction that the user press the cancellation button as the error display. When the cancellation button 534 is selected, the cloud control section 100 cancels printing. The continuing button 533 is displayed in a grayout state so as to indicate that an operation is not allowed. FIG. 14 illustrates a case where printing is not possible when the number of printable sheets in black and white is smaller than the number of sheets on which print data is printed. However, for example, when the number of printable sheets in black and white or color is large enough, printing may be allowed to be continuously performed in black and white or color. Printing may be allowed by collective printing and the like.

Figure 15:
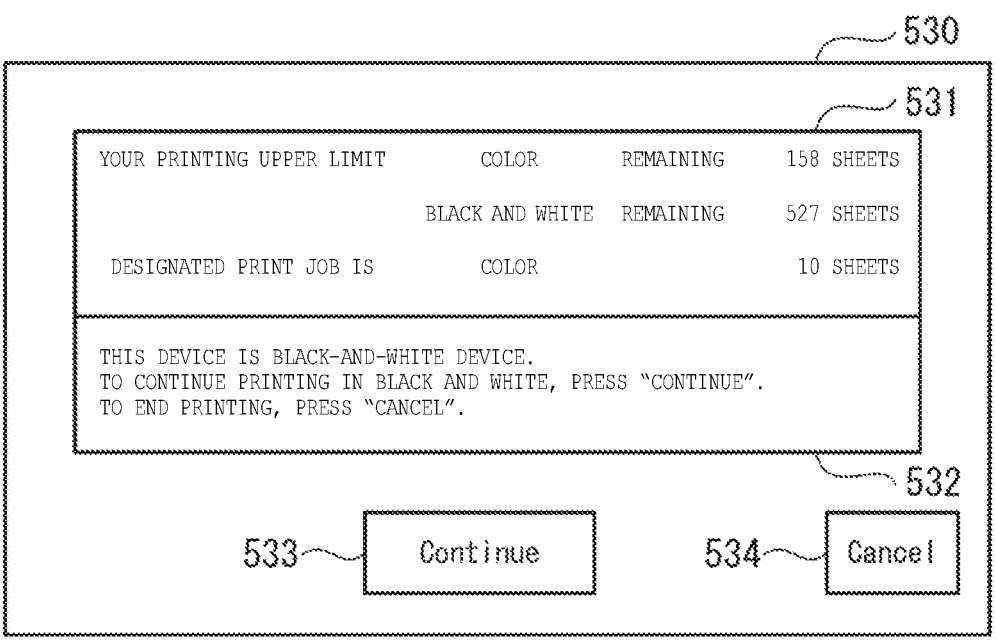
FIG. 15 illustrates a third display example of the user authority display according to the embodiment.

FIG. 15 illustrates a third display example of the user authority display 530 displayed on the operation display unit 13 according to the present embodiment. In FIG. 15, the number of color printable sheets is 158, the number of black-and-white printable sheets is 527, and additional information in image data is color (10 sheets). Thus, the user authority information 531 indicates that printing is allowed according to the use authority of the user.

However, since the image forming apparatus 1 in FIG. 15 is a black-and-white machine, the operation instruction 532 displays a message indicating that color printing is not possible. When the user selects the continuing button 533, the cloud control section 100 starts black-and-white printing. When the cancellation button 534 is selected, the cloud control section 100 cancels printing. The user can recognize that the number of pages is in the range of the number of printable sheets, from the display of the user authority information 531. Thus, for example, the user can know that the user has to perform the similar operation on a color image forming apparatus to perform color printing.

Figure 16:
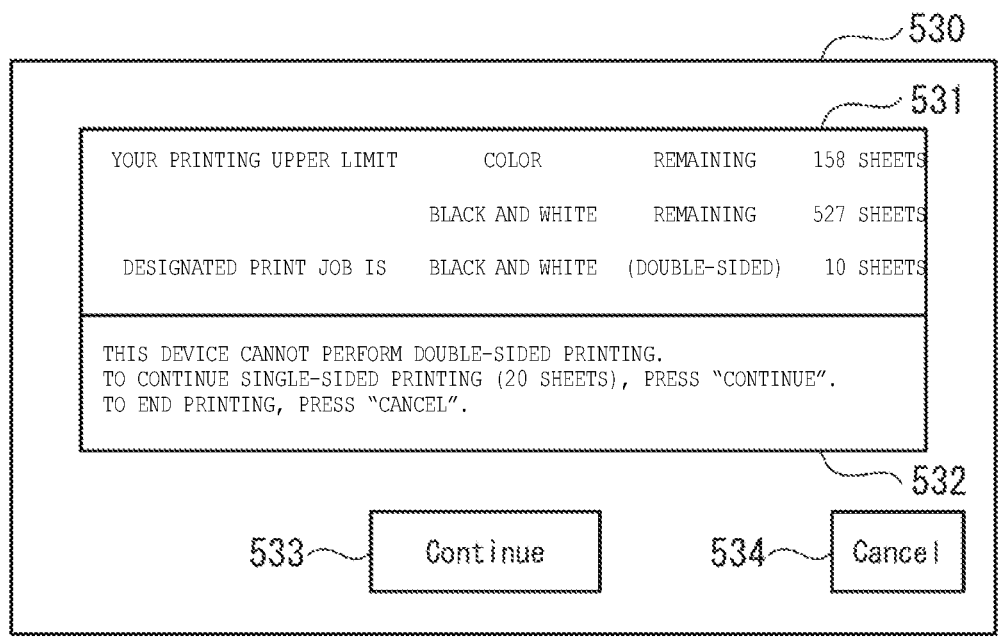
FIG. 16 illustrates a fourth display example of the user authority display according to the embodiment.

FIG. 16 illustrates a fourth display example of the user authority display 530 displayed on the operation display unit 13 according to the present embodiment. In FIG. 16, the number of color printable sheets is 158, the number of black-and-white printable sheets is 527, and additional information in image data indicates 10 sheets (double-sided) in black-and-white printing. Thus, the user authority information 531 indicates that printing is allowed according to the use authority of the user.

However, since double-sided printing by the image forming apparatus 1 in FIG. 16 is not possible, the operation instruction 532 displays a message indicating that double-sided printing is not possible. When the user selects the continuing button 533, the cloud control section 100 starts single-side printing so as to obtain 20 sheets. When the cancellation button 534 is selected, the cloud control section 100 cancels printing. The user can recognize that the number of pages is in the range of the number of printable sheets, from the display of the user authority information 531. Thus, for example, the user can know that the user has to perform the similar operation on an image forming apparatus that has a function of double-sided printing.

According to at least one aforementioned embodiment, the image forming apparatus includes the image reading unit, the additional information generation unit, the communication unit, and the image data management unit. The image reading unit reads an image to generate image data. The additional information generation unit generates additional information of the read image. The communication unit communicates with the data storage device which stores data, through the network. The image data management unit correlates the generated image data and the generated additional information, and registers the image data and the additional information which are correlated with each other, in the data storage device through the network. Thus, even when image data stored in the storage device is not acquired, the additional information can be referred to.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus, comprising:
   a scanner;
   a communication interface;
   a printer;
   a data storage in which user authority information indicating a remaining number of sheets that are authorized for printing is stored;
   an operation display unit, the operation display unit including a control panel for inputting a user authority instruction and a scan instruction; and
   a controller configured to:
      when the user authority instruction is selected on the control panel, control the communication interface to transmit, to a server, user authentication information for use of the server by a user, wherein the server is connected to the image processing apparatus through a network,
      when the scan instruction is selected on the control panel, generate property and setting data of image data that is generated based on image scanning by the scanner, the property and setting data of the image data indicating the number of pages in the image data, and
      after both the user authority instruction and the scan instruction have been selected on the control panel, and after transmitting the user authentication information to the server,
      control the communication interface to transmit the image data and the property and setting data thereof to the server so that the image data and the property and setting data thereof are stored therein in association with each other,
      retrieve the property and setting data of the image data from the server,
      determine whether or not the remaining number of sheets indicated by the user authority information is sufficient for printing the image data based on the number of pages in the image data as indicated by the retrieved property and setting data of the image data, and
      after determining that the remaining number of sheets is sufficient so that printing can be carried out, retrieve the image data from the server, and control the printer to carry out printing of the retrieved image data in accordance with the retrieved property and setting data.

2. The image processing apparatus according to claim 1, wherein
   the controller is further configured to store the property and setting data of the image data in the data storage and use at least part of the property and setting data stored in the data storage as property and setting data of second image data that is generated after the image data.

3. The image processing apparatus according to claim 1, wherein
   the image data and the property and setting data of the image data are transmitted to the server along with a token that is received from the server in response to the user authentication information, and
   when a registration of the property and setting data of image data at the server fails, the controller instructs the server to delete the registered image data corresponding to the property and setting data which failed to be registered.

4. The image processing apparatus according to claim 3, wherein
   the controller is further configured to store, in the data storage, second user authentication information for use of the image processing apparatus by the user in association with the token, the token being received during use of the image processing apparatus under user authorization with the second user authentication information.

5. The image processing apparatus according to claim 1, wherein
   the property and setting data includes at least one of page number, resolution, file format, color setting, and duplex setting.

6. The image processing apparatus according to claim 1, wherein
   the controller is further configured to generate an error notification upon determining that the printing is not authorized.

7. The image processing apparatus according to claim 1, wherein
   the controller is further configured to:
      determine the image processing apparatus is compatible with the printing in accordance with the property and setting data, and
      upon determining that the image processing apparatus is not compatible, carry out printing of the image data in accordance with a compatible setting corresponding to the property and setting data.

8. The image processing apparatus according to claim 7, wherein
   the compatible setting includes black-and-white printing, when the property and setting data indicates color printing and the image processing apparatus is not compatible with color printing.

9. The image processing apparatus according to claim 7, wherein
   the compatible setting includes single-sided printing, when the property and setting data indicates duplex printing and the image processing apparatus is not compatible with duplex printing.

10. A method for operating an image processing apparatus having a scanner and a control panel, the method comprising:
    when a user authority instruction is selected on the control panel, transmitting, to a sever, user authentication information for use of a server by a user, wherein the server is connected to the image processing apparatus through a network;

when a scan instruction is selected on the control panel, generating property and setting data of image data that is generated based on image scanning by the scanner, the property and setting data indicating the number of pages in the image data; and after both the user authority instruction and the scan instruction have been selected on the control panel, and after transmitting the user authentication to the server transmitting the image data and the property and setting data thereof to the server so that the image data and the property and setting data thereof are stored therein in association with each other, retrieving the property and setting data of the image data from the server, determining whether or not a remaining number of sheets indicated by user authority information is sufficient for printing the image data based on the number of pages in the image data as indicated by the retrieved property and setting data of the image data, and after determining that the remaining number of sheets is sufficient so that printing can be carried out, retrieving the image data from the server, and carrying out printing of the retrieved image data in accordance with the retrieved property and setting data.

11. The method according to claim 10, further comprising:

storing, in a data storage, the property and setting data of the image data; and transmitting second image data generated after the image data and at least part of the property and setting data to the server through the network, so that the second image data and said at least part of the property data are stored therein in association with each other.

12. The method according to claim 10, further comprising:

receiving a token from the server in response to the user authentication information, wherein the image data and the property and setting data of the image data are transmitted to the server along with the token, and when a registration of the property and setting data of image data at the server fails, the control panel instructs the server to delete the registered image data corresponding to the property and setting data which failed to be registered.

13. The method according to claim 12, further comprising:

storing, in a data storage, second user authentication information for use of the image processing apparatus by the user in association with the token, the token being received during use of the image processing apparatus under user authorization with the second user authentication information.

14. The method according to claim 10, wherein the property and setting data includes at least one of page number, resolution, file format, color setting, and duplex setting.

15. A system comprising an image processing apparatus and a server, wherein the image processing apparatus comprises:
a scanner;
a communication interface;
a printer;
a data storage in which user authority information indicating a number of pages that are authorized for printing is stored;
an operation display unit, the operation display unit including a control panel for inputting a user authority instruction and a scan instruction; and
a controller configured to:
when the user authority instruction is selected on the control panel, control the communication interface to transmit, to a sever, user authentication information for use of the server by a user, wherein the server is connected to the image processing apparatus through a network,
when the scan instruction is selected on the control panel, generate property and setting data of image data that is generated based on image scanning by the scanner, the property and setting data of the image data indicating the number of pages in the image data, and
after both the user authority instruction and the scan instruction have been selected on the control panel, and after transmitting the user authentication to the server
control the communication interface to transmit the image data and the property and setting data thereof to the server
retrieve the property and setting data of the image data from the server,
determine whether or not the remaining number of sheets indicated by the user authority information is sufficient for printing the image data based on the number of pages in the image data as indicated by the retrieved property and setting data of the image data, and
after determining that the remaining number of sheets is sufficient so that printing can be carried out, retrieve the image data from the server, and control the printer to carry out printing of the retrieved image data in accordance with the retrieved property and setting data, wherein the server is configured to store the image data and the property and setting data thereof in association with each other.

16. The system according to claim 15, wherein
the server is further configured to return a token to the image processing apparatus, in response to the user authentication information when the user is successfully authorized,
the image data and the property and setting data of the image data are transmitted to the server along with the token, and
when a registration of the property and setting data of image data at the server fails, the controller instructs the server to delete the registered image data corresponding to the property and setting data which failed to be registered.

* * * * *